United States Patent
Kim et al.

(10) Patent No.: US 11,177,870 B2
(45) Date of Patent: Nov. 16, 2021

(54) METHOD BY WHICH RELAY UE HAVING CONNECTION WITH REMOTE UE CONNECTS NETWORK IN WIRELESS COMMUNICATION SYSTEM AND APPARATUS THEREFOR

(71) Applicant: LG ELECTRONICS INC., Seoul (KR)

(72) Inventors: Laeyoung Kim, Seoul (KR); Jaehyun Kim, Seoul (KR); Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 16/476,732

(22) PCT Filed: Jan. 9, 2018

(86) PCT No.: PCT/KR2018/000403
§ 371 (c)(1),
(2) Date: Oct. 16, 2019

(87) PCT Pub. No.: WO2018/128519
PCT Pub. Date: Jul. 12, 2018

(65) Prior Publication Data
US 2020/0059292 A1 Feb. 20, 2020

Related U.S. Application Data

(60) Provisional application No. 62/444,363, filed on Jan. 9, 2017, provisional application No. 62/452,293, filed
(Continued)

(51) Int. Cl.
*H04W 76/27* (2018.01)
*H04W 76/10* (2018.01)
(Continued)

(52) U.S. Cl.
CPC .......... *H04B 7/15* (2013.01); *H04W 74/0833* (2013.01); *H04W 76/10* (2018.02); *H04W 76/27* (2018.02); *H04W 88/04* (2013.01)

(58) Field of Classification Search
CPC .... H04B 7/15; H04W 74/0833; H04W 88/04; H04W 76/10; H04W 76/27
See application file for complete search history.

(56) References Cited

U.S. PATENT DOCUMENTS

2013/0237267 A1* 9/2013 Lee .................. H04W 4/70
455/509
2014/0126460 A1 5/2014 Bienas et al.
(Continued)

FOREIGN PATENT DOCUMENTS

| KR | 1020160003257 | 1/2016 |
|----|---------------|--------|
| WO | 2016161867 | 10/2016 |
| WO | 2016163541 | 10/2016 |
| WO | 2016164808 | 10/2016 |

OTHER PUBLICATIONS

European Patent Office Application Serial No. 18735893.2, Search Report dated Sep. 8, 2020, 6 pages.
(Continued)

*Primary Examiner* — Muthuswamy G Manoharan
(74) *Attorney, Agent, or Firm* — Lee, Hong, Degerman, Kang & Waimey

(57) ABSTRACT

One embodiment of the present invention relates to a method by which a relay user equipment (UE) having a connection with a remote UE connects a network in a wireless communication system, the connection method transmitting a RRC connection setup complete message after receiving a relay request from the remote UE and then transmitting a random access preamble to a base station, wherein an establishment cause included in a RRC connection request is determined by considering whether the relay UE needs a connection request for traffic thereof and/or a (Continued)

priority between an establishment cause for a connection request, of the relay UE, for traffic thereof and an establishment cause set on the basis of the information provided by the remote UE.

10 Claims, 11 Drawing Sheets

Related U.S. Application Data on Jan. 30, 2017, provisional application No. 62/544,884, filed on Aug. 13, 2017, provisional application No. 62/597,424, filed on Dec. 12, 2017.

(51) Int. Cl.
*H04W 88/04* (2009.01)
*H04W 74/08* (2009.01)
*H04B 7/15* (2006.01)

(56) References Cited

U.S. PATENT DOCUMENTS

| | | |
|---|---|---|
| 2014/0307611 A1 | 10/2014 | Tesanovic et al. |
| 2016/0212682 A1* | 7/2016 | Chung ............... H04W 76/14 |
| 2016/0234806 A1 | 8/2016 | Le Thierry D'Ennequin et al. |
| 2016/0295494 A1 | 10/2016 | Gulati et al. |
| 2017/0055282 A1* | 2/2017 | Sadiq .................. H04W 4/70 |
| 2017/0142653 A1* | 5/2017 | Qi ..................... H04W 52/0212 |
| 2018/0295556 A1* | 10/2018 | Baek ................... H04L 63/08 |

OTHER PUBLICATIONS

PCT International Application No. PCT/KR2018/000403, Written Opinion of the International Searching Authority dated Apr. 12, 2018, 19 pages.

* cited by examiner

Scenario 1 : OOC and connected to relay

Scenario 2 : OOC and no connected to relay

Scenario 3 : In coverage and no connection to relay

Scenario 4 : In coverage and connected to relay

METHOD BY WHICH RELAY UE HAVING CONNECTION WITH REMOTE UE CONNECTS NETWORK IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/000403, filed on Jan. 9, 2018, which claims the benefit of U.S. Provisional Application Nos. 62/444,363, filed on Jan. 9, 2017, 62/452,293, filed on Jan. 30, 2017, 62/544,884, filed on Aug. 13, 2017, and 62/597,424, filed on Dec. 12, 2017, the contents of which are hereby incorporated by reference herein in their entirety.

TECHNICAL FIELD

The present disclosure relates to a wireless communication system, and more particularly, to a method and apparatus for establishing a connection with a network by a relay user equipment (UE) having a connection to a remote UE.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

An aspect of the present disclosure is to provide a method of establishing a connection with a network by a relay user equipment (UE) having a connection to a remote UE, specifically a method of applying access control (AC) and a method of processing a connection request triggered by traffic of a remote UE.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of establishing a connection with a network by a relay user equipment (UE) having a connection to a remote UE in a wireless communication system includes receiving a relay request from the remote UE, transmitting a random access preamble to a base station (BS) after receiving the relay request, receiving a random access response in response to the random access preamble, transmitting a radio resource control (RRC) connection request message after receiving the random access response, and transmitting an RRC connection setup complete message after receiving an RRC connection setup message in response to the RRC connection request message. An establishment cause included in the RRC connection request message is determined in consideration of one or more of whether the relay UE needs to request a connection for traffic of the relay UE and priority between an establishment cause for the connection request for the traffic of the relay UE and an establishment cause set based on information provided by the remote UE.

In an aspect of the present disclosure, a relay UE having a connection to a remote UE, for establishing a connection with a network in a wireless communication system includes a transceiver and a processor. The processor is configured to receive a relay request from the remote UE, to transmit a random access preamble to a BS after receiving the relay request, to receive a random access response in response to the random access preamble, to transmit an RRC connection request message after receiving the random access response, and to transmit an RRC connection setup complete message after receiving an RRC connection setup message in response to the RRC connection request message. An establishment cause included in the RRC connection request message is determined in consideration of one or more of whether the relay UE needs to request a connection for traffic of the relay UE and priority between an establishment cause for the connection request for the traffic of the relay UE and an establishment cause set based on information provided by the remote UE.

If the relay UE does not need to request the connection for the traffic of the relay UE, the RRC connection request message may include the establishment cause set based on the information provided by the remote UE.

The RRC connection setup complete message may include an establishment cause set for use in a relay operation of the relay UE.

The RRC connection setup complete message may include information indicating that the establishment cause transmitted in the RRC connection request message is for the remote UE.

If the relay UE needs to request the connection for the traffic of the relay UE, the RRC connection request message may include an establishment cause having a higher priority between the establishment cause set for the connection request for the traffic of the relay UE and the establishment cause set based on the information provided by the remote UE.

The RRC connection setup complete message may include an establishment cause having a lower priority between the establishment cause set for the connection request for the traffic of the relay UE and the establishment cause set based on the information provided by the remote UE.

The RRC connection setup complete message may include information indicating whether the establishment cause transmitted in the RRC connection request message is for the remote UE.

The method may further include receiving a message indicating generation of traffic from the remote UE.

The message indicating generation of traffic may include one or more of information indicating uplink traffic, information indicating control plane (CP) traffic, a priority of the traffic, a priority of the remote UE, access class information about the remote UE, and access control (AC) applicable to the traffic.

In one of a case in which the remote UE is aware that the relay UE is idle, a case in which uplink traffic is initially generated after the remote UE establishes a connection with the relay UE, a case in which a predetermined time has elapsed after the remote UE transmits and receives traffic via the relay UE, and a case in which the remote is not aware whether the relay UE is idle, the remote UE may transmit the message indicating generation of traffic.

The relay UE may determine whether the traffic generated by the remote UE is related to AC.

The relay UE may transmit a response to the message indicating generation of traffic to the remote UE, and if the traffic generated by the remote UE is related to AC, the response to the message indicating generation of traffic may include AC information.

If the response to the message indicating generation of traffic includes AC information, the remote UE may determine whether AC is applied to the traffic generated by the remote UE.

Advantageous Effects

According to the present disclosure, a relay user equipment (UE) may avoid the disadvantage of extra fees or overcharges for exception data that the relay UE has not transmitted.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
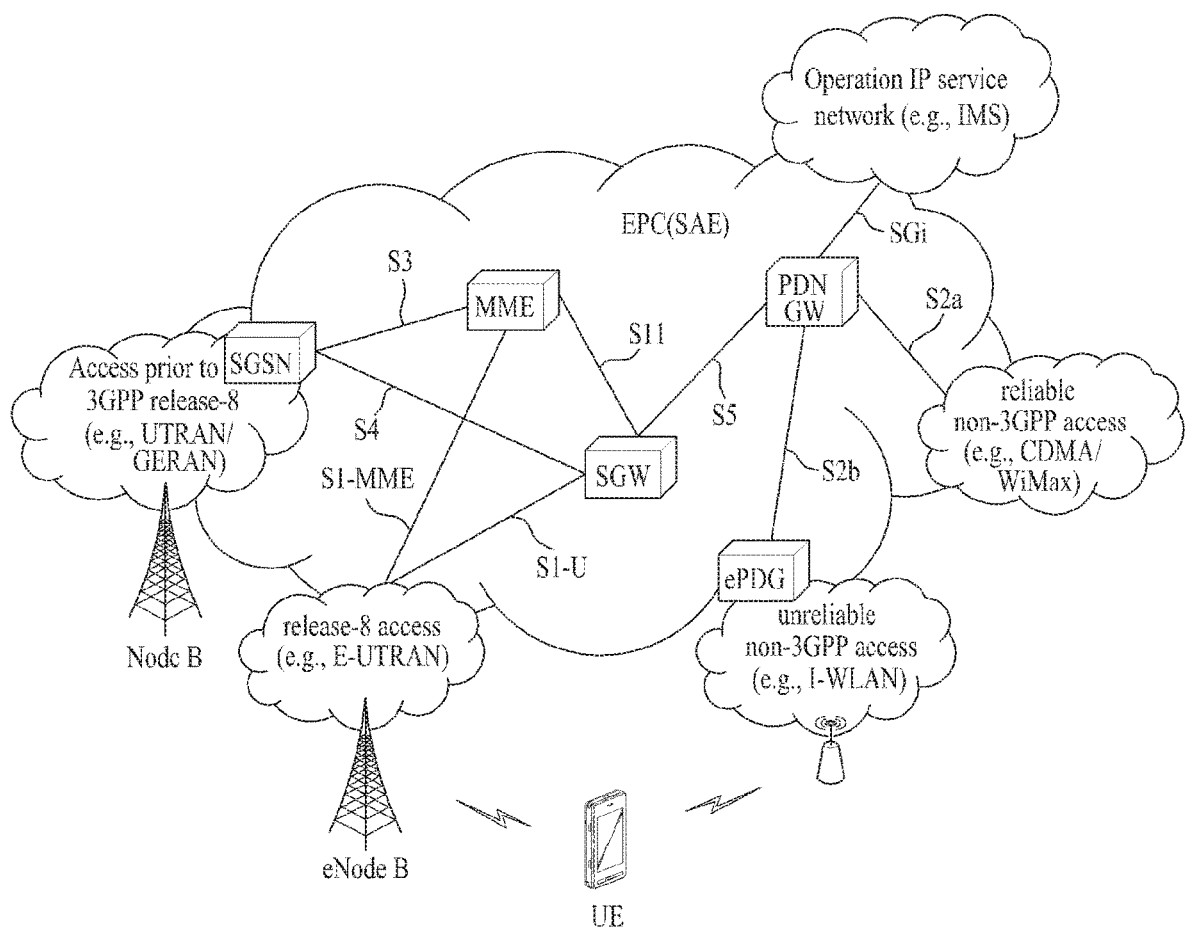
FIG. 1 is a schematic diagram illustrating the structure of an Evolved Packet System (EPS) including an Evolved Packet Core (EPC)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer)

and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
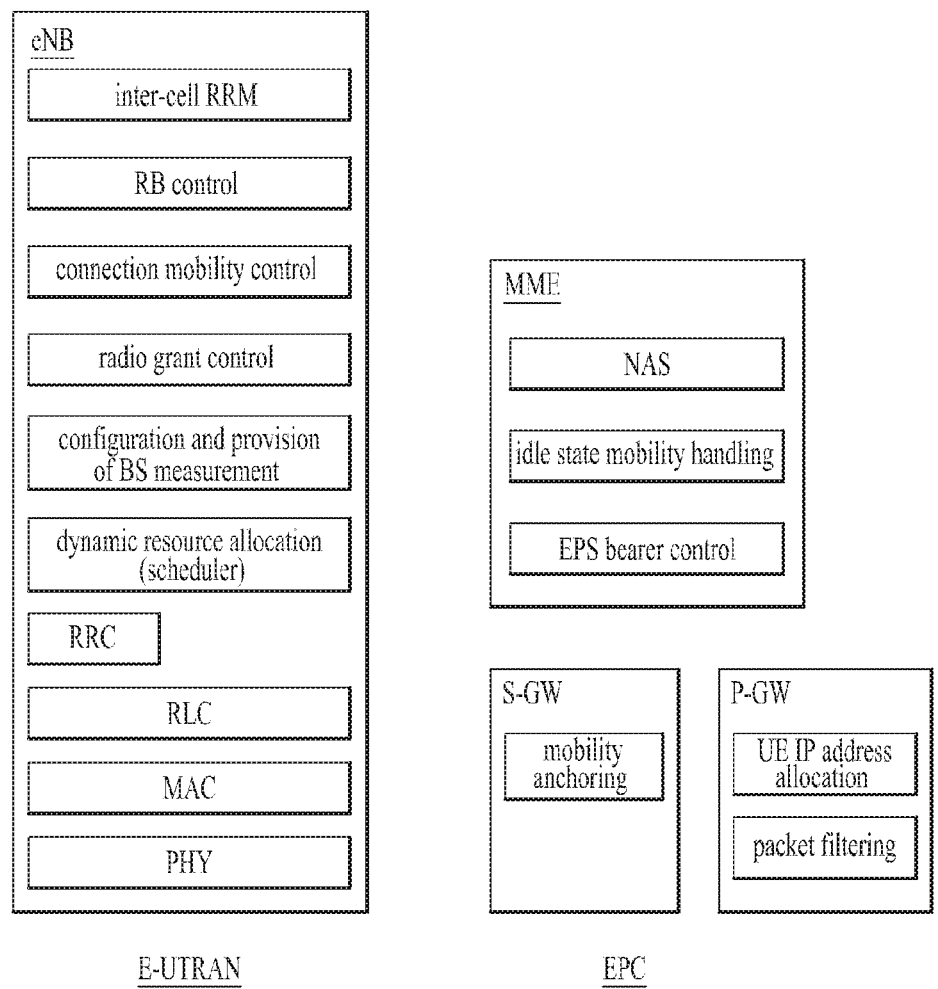
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
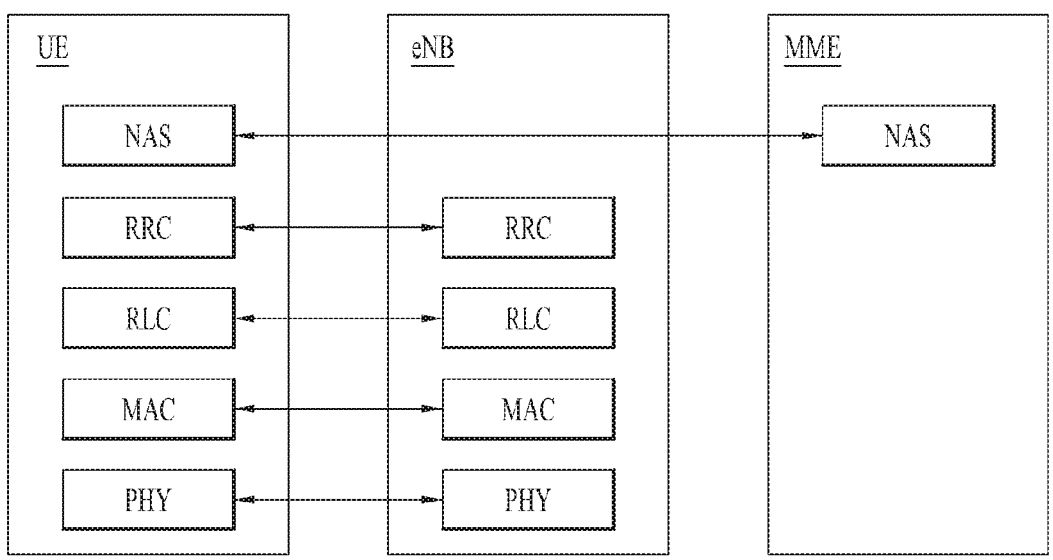
FIG. 3 is a diagram illustrating the structure of a radio interface protocol in a control plane.
Figure 4:
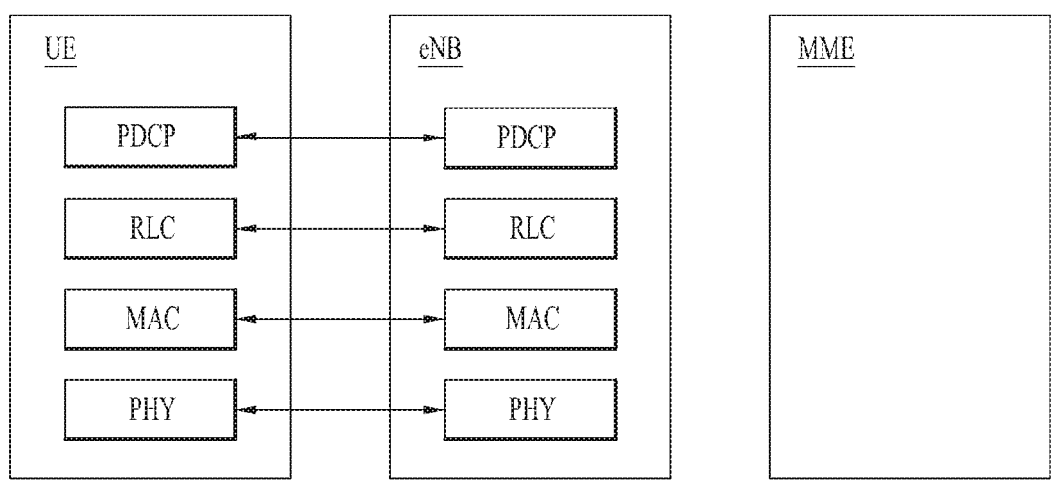
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
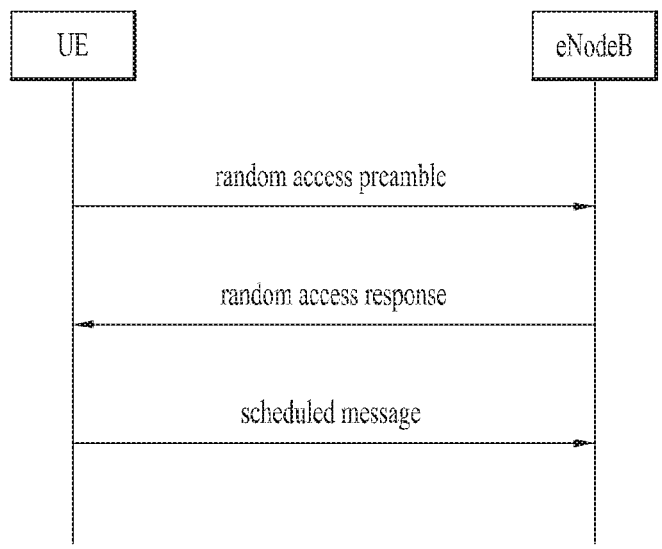
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
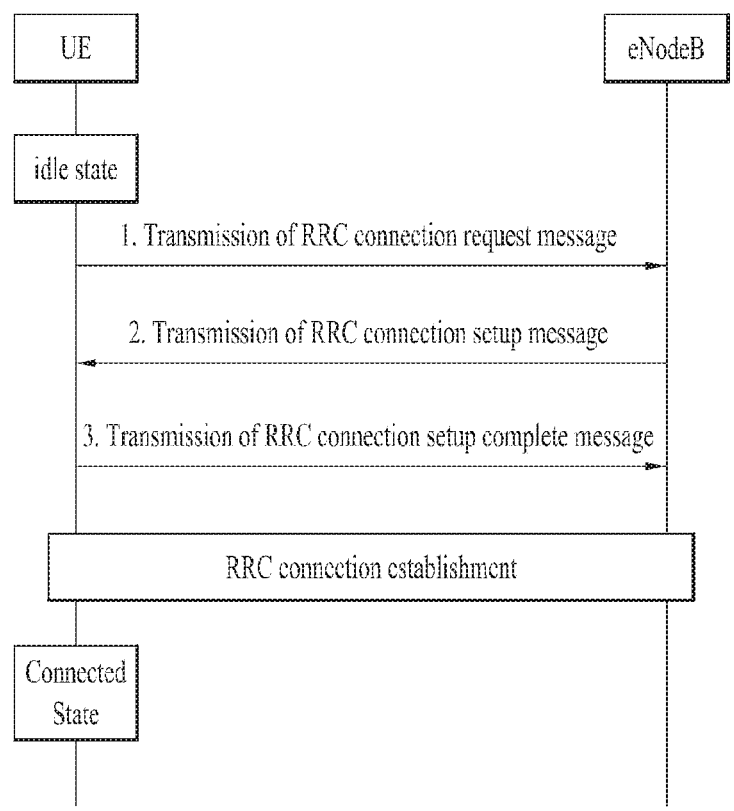
FIG. 6 is a diagram illustrating a connection process in a Radio Resource Control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
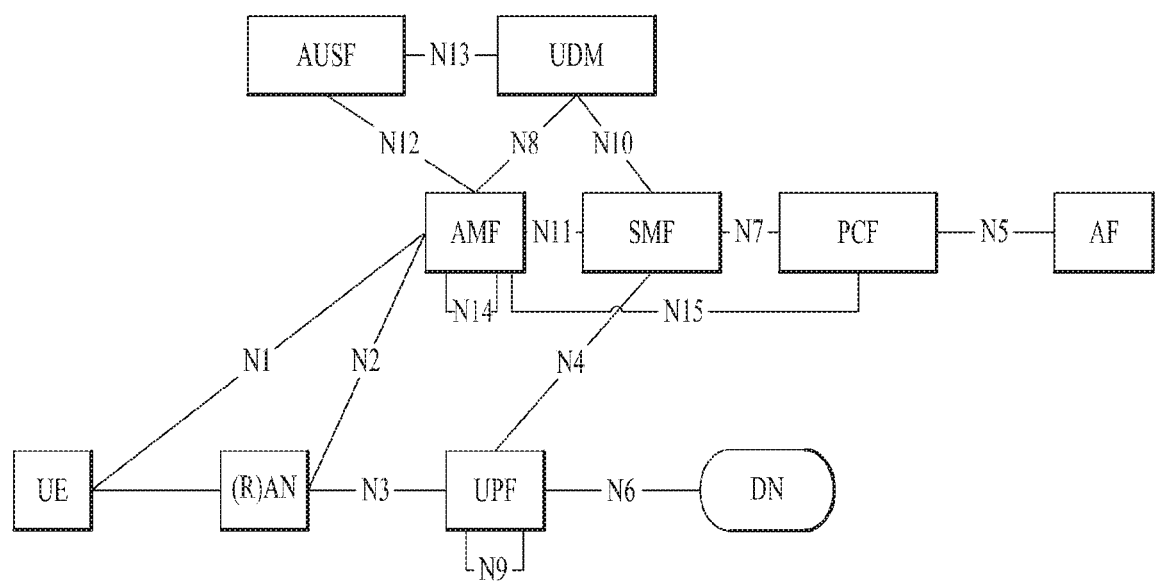
FIG. 7 is a diagram illustrating a 5th generation (5G) system.

The functionality of the MME in the legacy EPC is decomposed into the core access and mobility management function (AMF) and the session management function (SMF) in the next generation system (or 5G core network (CN)). The AMF carries out NAS interaction and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may be configured as illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the PCRF of the EPC. Obviously, the functionalities may be extended to satisfy the requirements of the 5G system. For details of the 5G system architecture, each function, and each interface, TS 23.501 is conformed to.

In 3GPP Release 14, SA1 worked on service requirements to allow even a non-public safety UE to receive a network connection service via a relay UE. Wearable devices are mainly under discussion as UEs that receive the network connection device via a relay UE. The following table presents the objective of WID (remote UE access via relay UE (REAR)) for the work on service requirements (see SP-160511). The objective of this work item is to specify service requirements needed to support the connection of a UE with UICC with a network via an evolved ProSe UE-to-network relay. It is assumed that the evolved ProSe UE-to-network relay uses the E-UTRAN to connect to the EPC. In this regard, the contents of Table 2 are considered.

TABLE 2

* The communication between the Evolved ProSe Remote UE and the Evolved ProSe UE-to-Network Relay to use either E-UTRA or WLAN. * The 3GPP system to support a user traffic session of an Evolved ProSe Remote UE to be relayed to the network via an Evolved ProSe UE-to-Network Relay. Note: The Evolved ProSe Remote UE has the functionality to directly connect to the EPC without a relay. * Security related requirements for communication from the Evolved ProSe Remote UE to the EPC. * Evaluate what 3GPP services that the 3GPP system will be able to support on an Evolved ProSe Remote UE connecting through an Evolved ProSe UE-to-Network Relay including e.g. emergency calls. In addition, it is also needed to consider if the 3GPP system need to support service continuity or fallback (e.g. CS Fallback) for those services. * Service requirements regarding different ownership and different HPLMNs of the Evolved ProSe Remote UE and Evolved ProSe UE-to-Network Relay. * Basic service requirements regarding charging aspects for respective MNO subscriptions. * What roaming scenarios that the 3GPP system will support regarding roaming of an Evolved ProSe Remote UE and connecting though an available Evolved ProSe UE-to-Network Relay in the visited network or a roaming relay UE. * Service requirements regarding UE consent and/or MNO control of an Evolved ProSe Remote UE connecting through an Evolved ProSe UE-to-Network Relay. * Service requirements on QoS for the services provided to an Evolved ProSe Remote UE connected via a Evolved ProSe UE-to-Network Relay. * Service requirements regarding PLMN selection. * Lower power consumption and lower complexity aspects for the Evolved ProSe Remote UE. * Evaluate the enhancements anticipated from this WID and investigate evolving ProSe Rel 12 and Rel 13 concepts for ProSe UE-to-Network Relay to use Evolved ProSe UE-to-Network Relay. * Consideration of co-existence with ProSe Rel 12 and Rel 13 services and users including shared radio spectrum cases. * Consideration of efficient use of LTE radio spectrum (especially when shared between in-coverage and out-coverage Evolved ProSe Remote UEs). * Support QoS concepts (according to TS23.203 and TS23.401) to allow to prioritization of high priority users and services both in-coverage of cell and out-of-coverage ProSe users and UEs served by Evolved ProSe-UE-to-Network Relays.

Figure 8:
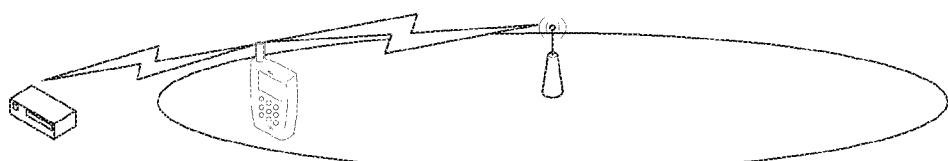
FIG. 8 is a diagram illustrating various scenarios for a relay.
Figure 8:
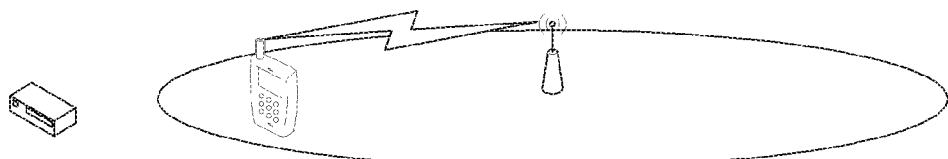
Figure 8:
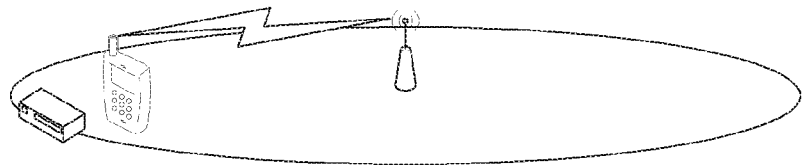
Figure 8:
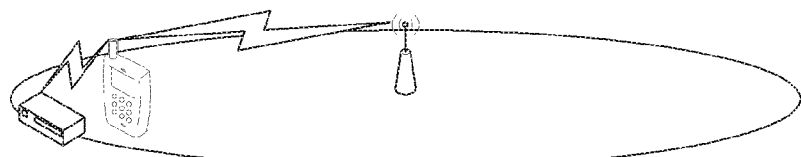

In TS 22.278, clause 7B (Indirect 3GPP Communication) and clause 7C (Requirements for relay UE selection for Evolved ProSe remote UE access via an Evolved ProSe UE-to-Network Relay) describe service requirements for REAR. Further, a solution to satisfy the REAR service requirements is under development in TR 36.746. Particularly, clause 4.3 describes various scenarios as illustrated in FIG. 8.

In TS 22.011, clause 4 (Access control) presents the following various access control-related service requirements.

i) Access Class Barring (ACB)
ii) Extended Access Barring (EAB)
iii) Service Specific Access Control (SSAC)
iv) Access Control for CSFB
v) Application specific Congestion control for Data Communication (ACDC)

i) and ii) are intended to prevent a UE from accessing an eNB during radio access congestion, and iii), iv), and v) are intended to prevent use of radio resources on an application or service basis. System information required to apply these various types of access control is broadcast in SIB2 and SIB14 as described in TS 36.331. While not described specifically in the disclosure, the information elements SystemInformationBlockType2 and SystemInformationBlockType14 of TS 36.331 and their related contents are background technology, which may be incorporated herein as relevant to the present disclosure described below.

The representative service requirement, ACB is an access control technique applied to relieve congestion, when a RACH (random access) load increases to a congestion state. Every UE is assigned one of Access Class (AC) 0 to AC 9 and stores the assigned AC in a SIM/USIM. The UE may further be assigned an AC (high-priority AC) for one of the following special purposes listed in Table 3 below, and when assigned, may also store the AC in the SIM/USIM.

TABLE 3

| | |
|---|---|
| Class 15 | PLMN Staff |
| Class 14 | Emergency Services |
| Class 13 | Public Utilities (e.g. water/gas suppliers) |
| Class 12 | Security Services |
| Class 11 | For PLMN Use |

A UE applies ACB based on ACB parameter information received in SIB2 from an eNB. ACP parameters include a barring factor and a barring time. The barring factor is a probability value between 0 and 1, which determines whether to bar a RACH during network congestion. A UE accessing the network generates a random number. If the random number is less than the barring factor, the UE attempts a RACH, and otherwise, the UE is barred from transmitting the RACH. The barring time is an average time during which the UE waits to attempt to transmit the barred RACH again. If the UE is barred from transmitting the RACH, this implies that the UE is not allowed to request an RRC connection to the eNB and thus does not receive a service from the network. For a high-priority UE with an AC ranging from AC 11 to AC 15, access is controlled by ac-BarringForSpecialAC. For a user initiating an emergency call (i.e., AC 10), access is controlled by ac-BarringForEmergency. A 3GPP document, S1-170354 defines service requirements related to access control for indirect communication, and this is background technology which may be incorporated herein as relevant to the present disclosure as described below.

As described above, the other AC mechanisms, such as ACB, EAB, SSAC, and ACDC, except for Access Control for CSFB should be applied to indirect communication. However, how the AC mechanisms are to be applied is yet to be specified.

Conventionally, when an eNB later forwards a NAS message received from a UE to an MME, the eNB may transmit an establishment cause value included in an RRC Connection Request message along with the NAS message. If the establishment cause value is a specific value, related information may be delivered from the MME even to a P-GW. For example, if the establishment cause is mo-ExceptionData, the MME transmits related information, MO Exception data counter to the P-GW via an S-GW, and the P-GW stores the MO Exception data counter in a charging data record (CDR) (see UE triggered Service Request in clause 5.3.4.1 of TS 23.401). The network may then charge the UE with extra fees or over fees for support of high-priority data transmission. In this case, the UE serving as a relay UE may face the disadvantage of extra fees or overcharges for exception data that the UE has not transmitted.

Therefore, an embodiment of the present disclosure proposes a method of providing indirect communication in consideration of AC and a connection procedure for preventing unnecessary billing for traffic transmission of a remote UE, which might otherwise be imposed on a relay UE.

An AC mechanism described in the present disclosure may be one of the foregoing AC mechanisms i) to v), or any other unmentioned AC mechanism. Further, the AC mechanism may be one adopted in at least one of a RAN, a core network, or an application layer. Further, the AC mechanism may be interpreted as a congestion control mechanism.

The proposal of the present disclosure includes operations performed for a remote UE to receive a service from a network via a relay UE (for the remote UE to establish an RRC connection and/or a NAS (i.e., S1-MME) connection and/or an S1-U connection to the network). These operations are applied to a case in which the remote UE applies the full AC mechanism without support of the relay UE as well as a case in which the relay UE supports the AC mechanism for the remote UE.

Embodiment 1

According to an embodiment of the present disclosure, a relay UE may receive a relay request/request for relay from a remote UE, and then transmit a random access preamble to an eNB. After receiving a random access response in response to the random access preamble, the relay UE may transmit an RRC Connection Request message. Subsequently, the relay UE may receive an RRC Connection Setup message in response to the RRC Connection Request message, and then transmit an RRC Connection Setup Complete message.

An establishment cause included in the RRC Connection Request message may be determined based on at least one of whether the relay UE needs to request a connection for its traffic (hereinafter, the traffic may be UL traffic) or priority between an establishment cause for the connection request for the traffic of the relay UE and an establishment cause set based on information provided by the remote UE.

If the relay UE does not need to request a connection for its traffic, the RRC Connection Request message includes an establishment cause set based on the information provided by the remote UE. Then, the RRC Connection Setup Complete message includes an establishment cause set for use in a relay operation of the relay UE. The RRC Connection Setup Complete message includes information indicating that the establishment cause transmitted in the RRC Connection Request message is for the remote UE. Thus, the relay UE may avoid the disadvantage of extra billing or overcharged billing for exception data that the relay UE has not transmitted.

The above operation will be described in greater detail. When the relay UE receives a network connection request from the remote UE, the relay UE checks whether the relay UE needs to request a connection to the network for itself, that is, whether the relay UE needs to requests a connection for its traffic.

If determining as the result of the check that the relay UE does not need to request a connection for its traffic (the relay UE does not need to request a network connection for itself), the relay UE sets an establishment cause in the RRC Connection Request message based on the information provided by the remote UE (particularly, priority information about the remote UE). Subsequently, when the relay UE transmits the RRC Connection Setup Complete message to the eNB, the relay UE includes the establishment cause set for use in the relay operation of the relay UE (an establishment cause value indicating relay, set for use in the RRC Connection Request (or Service Request) message transmitted to the network, for the relay operation) in the RRC Connection Setup Complete message. For this purpose, a new information element may be defined. Information indicating that the establishment cause information is for the relay UE may further be included in the RRC Connection Setup Complete message. Information indicating that the establishment cause information in the transmitted RRC Connection Request message is for the remote UE may further be included in the RRC Connection Setup Complete message. The establishment cause-related information included in the RRC Connection Setup Complete message may be interpreted as indicating that the establishment cause information in the transmitted RRC Connection Request message is for the remote UE. A Service Request message generated by the remote UE or a Service Request message generated by the relay UE may be included in the RRC Connection Setup Complete message. In the former case, the establishment cause value (e.g., relay) set for use in the RRC Connection Request or Service Request message that the relay UE transmits to the network, for the relay operation may not be included in the RRC Connection Setup Complete message.

In another example, if determining as the result of the check that the relay UE does not need to request a connection for its traffic, the relay UE may set the establishment cause in the RRC Connection Request message based on the information provided by the remote UE (particularly, the priority information about the remote UE). In another method, the establishment cause may be set to an establishment cause value set for use in a Service Request message that the remote UE transmits to the network, for the relay operation. That is, an information element defined to include a legacy establishment cause may be used and referred to as an establishment cause for the relay UE. This may be one (e.g., mo-Data) of values available as legacy establishment cause values, or a new establishment cause value (e.g., relay) defined for this purpose. Additional establishment cause information is included as an establishment cause for the remote UE, i.e., an establishment cause set based on the information provided by the remote UE. That is, for this purpose, a new information element (or parameter) is defined, and the establishment cause set based on the information provided by the remote UE is included in the new information element. When two pieces of establishment cause information are included in the RRC Connection Request message as described above, the eNB considers both, particularly a value considered to have a higher congestion priority in processing the RRC Connection Request message.

On the contrary, if the relay UE needs to request a connection for its traffic, the RRC Connection Request message may include an establishment cause having a higher priority between the establishment cause set for use in the connection request for traffic of the relay UE by the relay UE and the establishment cause set based on the information provided by the remote UE. The RRC Connection Setup Complete message may include an establishment cause having a lower priority between the establishment cause set for use in the connection request for traffic of the relay UE by the relay UE and the establishment cause set based on the information provided by the remote UE. In this case, the RRC Connection Setup Complete message includes information indicating whether the establishment cause transmitted in the RRC Connection Request message is for the remote UE. Therefore, the relay UE may avoid the disadvantage of extra billing or overcharged billing which might otherwise be imposed on the relay UE for exception data that the relay UE has not transmitted. That is, if the establishment cause value included in the RRC Connection Request message is for the relay UE, the establishment cause value included in the RRC Connection Setup Complete message is for the remote UE. On the other hand, if the establishment cause value included in the RRC Connection Request is for the remote UE, the establishment cause value included in the RRC Connection Setup Complete message is for the relay UE.

The above embodiment will be described in more detail. The establishment cause with the higher priority between the establishment cause based on the information provided by the remote UE (e.g. priority information about UE#1) and the establishment cause for the connection request for traffic of the relay UE (the establishment cause to be used for the relay UE to request a connection to the network) is used. If the priorities of the establishment causes are identical (or considered to be identical), the establishment cause of the relay UE is used. In regard to establishment causes, establishment causes listed in Table 4, as defined in TS 36.331 may be used, and commonly in the disclosure.

TABLE 4

EstablishmentCause ::=     ENUMERATED {
    emergency, highPriorityAccess, mt-Access, mo-Signalling,
    mo-Data, delayTolerantAccess-v1020, mo-VoiceCall-v1280, spare1}
EstablishmentCause-NB-r13 ::=     ENUMERATED {
    mt-Access, mo-Signalling, mo-Data, mo-ExceptionData,
    delayTolerantAccess-v1330, spare3, spare2, spare1}

A specific example based on priorities will be described. For example, if an establishment cause provided by the remote UE is emergency and an establishment cause intended by the relay UE is mo-Data, the relay UE sets the establishment cause to emergency considered to have the higher priority in the RRC Connection Request message transmitted to the eNB. This operation is meant to indicate to the eNB that since the RRC Connection Request message is for emergency service, the RRC Connection Request message should be considered with priority over an RRC Connection Request message with an establishment cause having a lower priority than emergency during congestion.

In another example, if the establishment cause provided by the remote UE is mo-ExceptionData and the establishment cause intended by the relay UE is mo-Data, the relay UE sets the establishment cause to mo-ExceptionData considered to have the higher priority in the RRC Connection Request message to be transmitted to the eNB. This operation is meant to indicate to the eNB that since the RRC Connection Request message is for indicating an emergency situation that an NB-IoT UE has detected, the RRC Connection Request message should be considered with priority over RRC Connection Request message with an establishment cause having a lower priority than mo-ExceptionData during congestion.

In another example, if the establishment cause provided by the remote UE is mo-Data and the establishment cause intended by the relay UE is mo-signalling, the relay UE sets the establishment cause to mo-signaling considered to have the higher priority in the RRC Connection Request message to be transmitted to the eNB. This operation is meant to indicate to the eNB that since the RRC Connection Request message is for signaling, the RRC Connection Request message should be considered with priority over RRC Connection Request message with an establishment cause having a lower priority than mo-signalling during congestion.

In the above operations, the NAS layer of the relay UE may select one of the establishment cause determined based on the information provided by the remote UE and the establishment cause intended by the NAS layer and indicate the selected establishment cause to the AS layer of the relay UE. Alternatively, the AS layer of the relay UE may select one of the establishment cause determined based on the information provided by the remote UE and the establishment cause received from the NAS layer.

When the relay UE transmits the RRC Connection Setup Complete message to the eNB, if the establishment cause included in the transmitted RRC Connection Request message was set based on the information provided by the remote UE (the establishment cause received from the remote UE), the relay UE includes the establishment cause for the connection request for its traffic in the RRC Connection Setup Complete message. It may be indicated explicitly or implicitly that the establishment cause information is for the relay UE (i.e., set to relay UE). Further, it may be indicated explicitly or implicitly by the RRC Connection Request message or the RRC Connection Setup Complete message that the establishment cause information included in the RRC Connection Request message is for the remote UE (i.e., set to remote UE).

When the relay UE transmits the RRC Connection Setup Complete message to the eNB, if the establishment cause included in the transmitted RRC Connection Request message was intended to be used by the relay UE, the relay UE includes the establishment cause set based on the information provided by the remote UE (the establishment cause information provided by the remote UE) in the RRC Connection Setup Complete message. It may be indicated explicitly or implicitly that the establishment cause information is for the remote UE (i.e., set to remote UE). Further, it may be indicated explicitly or implicitly by the RRC Connection Request message or the RRC Connection Setup Complete message that the establishment cause information included in the RRC Connection Request message is for the relay UE (i.e., set to relay UE). To include the establishment cause information in the RRC Connection Setup Complete message, a new information element may be defined. Further, if a Service Request message included in the RRC Connection Setup Complete message was generated by the remote UE, the relay UE may include the establishment cause information provided by the remote UE in the RRC Connection Setup Complete message. On the other hand, if the Service Request message included in the RRC Connection Setup Complete message was generated by the relay UE, the relay UE may include the establishment cause information intended by the relay UE in the RRC Connection Setup Complete message.

In another example, the relay UE sets the establishment cause to the establishment cause value used for the connection request for its traffic. That is, an information element which was defined to include a legacy establishment cause is used, and may be referred to as an establishment cause for the relay UE. Additional establishment cause information is included, which is the establishment cause for the remote UE and configured by the information provided by the remote UE. That is, for this purpose, a new information element (or parameter) is defined, and the establishment cause set based on the information provided by the remote UE is included in the new information element. As such, when two pieces of establishment cause information are included in an RRC Connection Request message, the eNB considers both in processing the RRC connection request. Particularly, the eNB considers the value considered to have the higher priority during congestion.

In the case where a new information element for an additional establishment cause is used in the above description, because establishment cause information for a network connection request of the remote UE is included in the additional information element, this may be processed irrespective of whether the above check is performed (irrespective of the relay UE autonomously checks whether a connection request to the network is required, when the relay UE receives a network connection request from the remote UE). Further, if the establishment cause value for the relay UE and the establishment cause value for the remote UE are identical, the establishment cause value for the remote UE may not be included.

Embodiment 1-1

Figure 9:
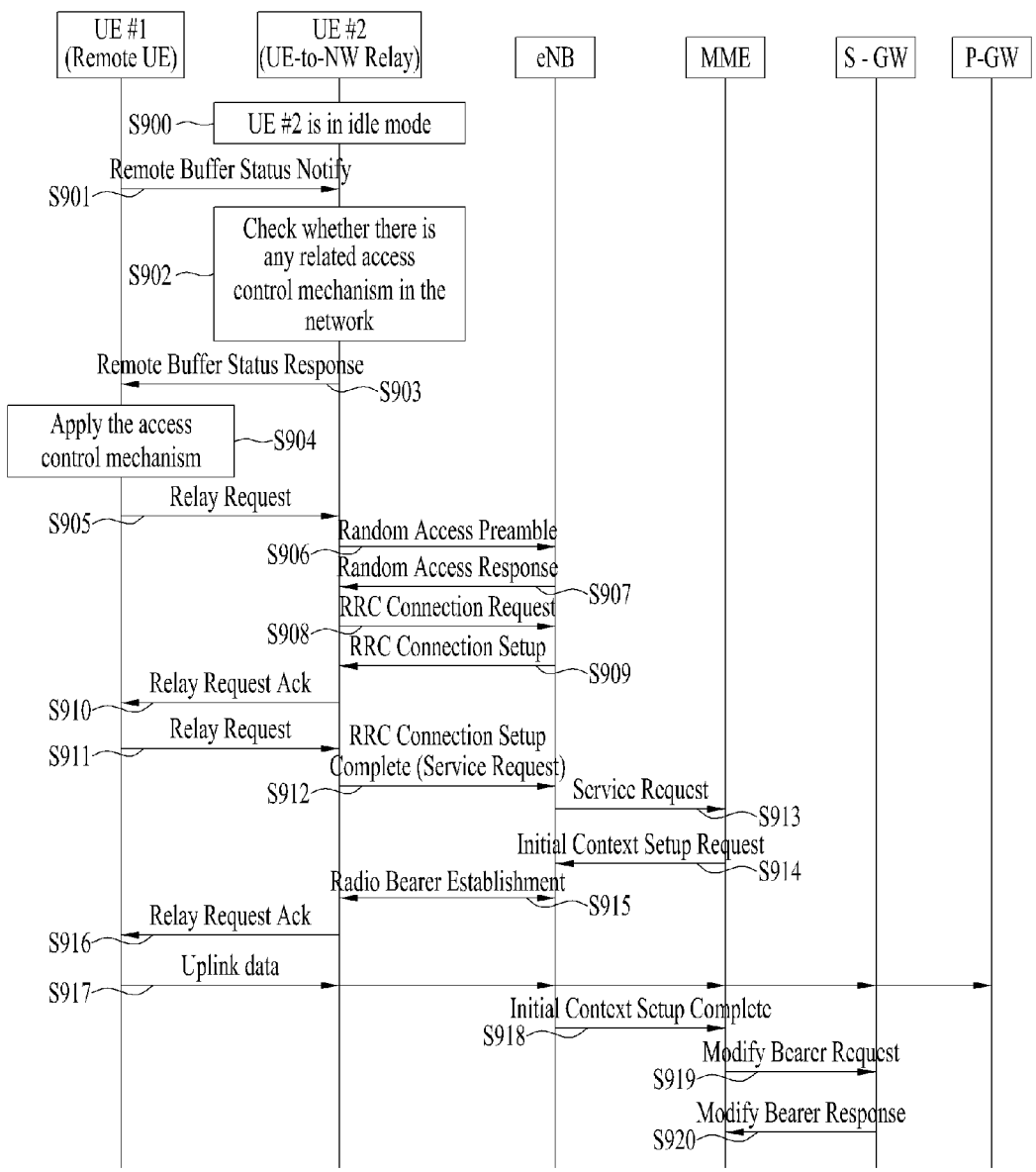
FIGS. 9 and 10 are diagrams illustrating embodiments of the present disclosure.

FIG. 9 illustrates an example in which Embodiment 1 is specifically implemented between network nodes. FIG. 9 and the following description may be added/inserted to/in the description of the above embodiment, unless conflicting with each other. For each step described below, the same description is not provided redundantly.

Referring to FIG. 9, a relay UE, UE#2 is in idle mode in step S900.

In step S901, the relay UE, UE#2 receives a message indicating generation of traffic from a remote UE, UE#1. The message is triggered by generation of traffic to be transmitted to the network at the remote UE, UE#1. The traffic may be user-plane traffic (hereinafter, referred to as traffic) such as data/packet/IMS signaling or control-plane traffic (hereinafter, referred to as CP traffic) such as RRC signaling/NAS signaling. These traffic definitions are applied commonly to traffic of the remote UE and traffic of the relay UE throughout the specification. The remote UE, UE#1 transmits a message indicating traffic generation (i.e., a message indicating traffic, e.g., Remote Buffer Status Notify) to the relay UE, UE#2. The message may be transmitted mainly by PC5 signaling. Or the message may be transmitted by newly defined PC5 PDCP. In this case, a new PC5 PDCP SDU type may be defined. In the present disclosure, all messages exchanged between the remote UE, UE#1 and the relay UE, UE#2 (in steps S903, S905, S910, S911, and S916 in FIG. 9) may be transmitted by PC5 signaling, the new defined PC5 PDCP, or the like.

The message indicating traffic generation may include one or more of information indicating UL traffic, information indicating CP traffic, the priority of the traffic, the priority of the remote UE, information about the access class of the remote UE, or AC information applicable to the traffic. Specifically, the information indicating UL traffic may further be specified. For example, the information may be service-related information such as MMTEL, MMTEL voice, MMTEL video, IMS SMS, or the like, or application information such as an application type, an application ID, or the like. Particularly, in the case of a service provided by IMS, such as MMTEL voice or MMTEL video, an IMS session is established before actual voice and video traffic, and the service information included in the message may be information extracted from SIP INVITE. The specific information may be included as 'MMTel voice', 'MMTel video', or the like, or include a value corresponding to a service/application by defining services/applications as enumerated values (e.g., MMTel voice=1, MMTel video=2, . . . ). Further, a service and an application may be included as separate information. This is applied throughout the disclosure. Even though a service request procedure is initiated in view of generation of UL traffic by the NAS layer of the remote UE, UE#1 and thus an RRC connection procedure is initiated by the AS layer of the remote UE, UE#1, the type of traffic to be transmitted to the network may be UL traffic.

The information indicating CP traffic may further be specified as an RRC signal, a NAS signal, an RRC signal including a NAS signal, or a NAS SMS, and the specified information may be included in addition to the information indicating CP traffic.

Traffic to be transmitted to the network may have priorities such as emergency, high priority, urgent, and so on. Further, this information may correspond to an establishment cause value included in an RRC Connection Request message.

The priority information about the remote UE, UE#1 may be represented as high priority. Further, this information may correspond to the establishment cause value included in the RRC Connection Request message.

One or more pieces of information may be about the types of AC mechanisms applicable/related to traffic to be transmitted to the network. For example, if MMTEL voice is to be transmitted to the network, SSAC and ACDC may be included. The information may be included as 'ACB', 'EAB', 'SSAC', or the like. Further, AC mechanisms may be defined as enumerated values (e.g., ACB=1, EAB=2,) and a value corresponding to an AC mechanism may be included. This is applied throughout the disclosure.

The remote UE, UE#1 may perform the above operation for one or more of the following reasons.

a) Since the remote UE is aware that the relay UE is in the idle mode, the remote UE may transmit the message indicating generation of UL traffic. This may correspond to a case in which it is explicitly or implicitly indicated to the remote UE that the relay UE is in the idle mode or has transitioned to the idle mode.

b) When traffic to be transmitted to the network is initially generated after a relay-remote relationship is established between the remote UE and the relay UE, the remote UE may transmit the message indicating generation of UL traffic.

c) The remote UE may transmit the message indicating generation of UL traffic due to elapse of a predetermined time after exchanging traffic with the network via the relay UE. The predetermined time may be set in the remote UE, received from the relay UE, or received from the network.

d) Since the remote UE has no knowledge of whether the relay UE is in the idle mode or connected mode, the remote UE may transmit the message indicating UL traffic. This corresponds to a case in which the relay UE does not indicate to the remote UE which mode the relay UE is in or has transitioned to and thus the remote UE does not know whether the relay UE is in the idle mode.

That is, in at least one of the cases where the remote UE knows that the relay UE is in the idle mode, UL traffic is initially generated after the remote UE is connected to the relay UE, a predetermined time has elapsed after traffic transmission and reception via the relay, and the remote UE does not know whether the relay UE is in the idle mode, the remote UE may transmit the message indicating traffic generation.

The remote UE performing step S901 may be considered to be in the idle mode.

In step S902, the relay UE, UE#2 determines whether the traffic to be transmitted to the network by the remote UE, UE#1 is related to an on-going AC mechanism operated in the network based on the information provided by the remote UE, UE#1. That is, the relay UE may determine whether the traffic generated in the remote UE is related to AC. As described before, the on-going AC mechanism operated in the network may be determined based on information included in an SIB received from the eNB.

If the relay UE does not support/check the AC mechanism for the remote UE or the remote UE performs the full AC mechanism, steps S902 to S905 are skipped. If step S905 is skipped, the operation performed in step S905 may be reflected in step S901. That is, the message transmitted to the relay UE in step S901 may be a Relay Request message, which may include an RRC Connection Request message generated in the AS layer of the remote UE, UE#1. For reference, when steps S902 to S905 are not performed as described above, it may be considered that the remote UE determines that it is allowed to perform step S901 as the result of applying the AC mechanism and thus performs step S901.

In step S903, if the traffic that the remote UE, UE#1 intends to transmit to the network is related to the on-going AC mechanism operated by the network as a result of step S902, the relay UE, UE#2 transmits, to the remote UE, UE#1, a response message, that is, a Remote Buffer Status Response message including all or part of information provided for the related AC mechanism by the network, as it is or after it is processed. The information eventually leads to application of the related AC mechanism by the remote UE, UE#1.

If the traffic that the remote UE, UE#1 intends to transmit to the network is not related to the on-going AC mechanism operated by the network or the network is not currently operating any AC mechanism, the relay UE, UE#2 transmits a response message, that is, a Remote Buffer Status Response message to the remote UE, UE#1. Optionally, the response message may explicitly indicate that the related AC mechanism is not operated.

If there is an on-going AC mechanism operated by the network and the relay UE, UE#2 is not capable of determining whether the traffic to be transmitted to the network by the remote UE, UE#1 is related to the on-going AC mechanism (e.g., because the remote UE, UE#1 does not include detailed information about the intended traffic to be transmitted to the network in step S901), the relay UE, UE#2 transmits, to the remote UE, UE#1, a response message, that is, a Remote Buffer Status Response message including all or part of the information provided for the related AC mechanism by the network, as it is or after it is processed. The information eventually leads to application of the related AC mechanism by the remote UE, UE#1.

The AC mechanism may be an AC mechanism applied particularly to the idle mode.

Irrespective of any of the above cases, the relay UE, UE#2 may include information indicating that the relay UE, UE#2 is in the idle mode in the Remote Buffer Status Response message.

If the relay UE, UE#2 is applying the AC mechanism and cannot access the network, the relay UE, UE#2 may provide information to this effect to the remote UE, UE#1. This information may be included in the Remote Buffer Status Response message or transmitted in a separate message.

In step S904, if the Remote Buffer Status Response message includes information about the AC mechanism, that is, AC mechanism information to be checked to determine whether to apply the AC mechanism, the remote UE, UE#1 checks whether the intended traffic to be transmitted to the network is subjected to the AC mechanism. This operation may be considered to be an operation of receiving the AC mechanism information directly from the network and applying the AC mechanism information by the remote UE, UE#1. As a result of the application, transmission of the UL traffic may be blocked/delayed or transmitted directly according to the AC mechanism.

If the Remote Buffer Status Response message does not include the AC mechanism information or the UL traffic can be transmitted without blockage/delay despite application of the AC mechanism, step S905 is performed (immediately/ successively).

If the UL traffic transmission is blocked/delayed according to the AC mechanism, step S905 is performed after the blockage/delay time. Instead, step S901 may be performed.

In step S905, the remote UE, UE#1 transmits to the relay UE, UE#2 a message requesting relay of the UL traffic to the network, for example, a Relay Request message. The message may include an RRC Connection Request message generated in the AS layer of the remote UE, UE#1. The message may explicitly or implicitly indicate the inclusion of the RRC message.

In step S906, the relay UE, UE#2 transmits a Random Access Preamble to the eNB. This operation is performed because the relay UE, UE#2 is assumed to be in the idle mode in step S900. If the relay UE, UE#2 is in the connected mode, steps S906 to S909 are skipped, and step S910 may be performed, as described below.

Step S906 may be performed as the relay UE, UE#2 in the idle mode receives a network connection request from the remote UE, UE#1 and initiates a Service Request. That is, as the NAS layer of the remote UE, UE#1 initiates the Service Request operation, the AS layer of the relay UE, UE#2 may perform step S906 in order to request an RRC connection to the eNB.

Further, as the idle-mode relay UE, UE#2 receives the network connection request from the remote UE, UE#1, is also coincidentally to receive a service from the network, and thus initiates the Service Request, step S906 may be performed. That is, as the NAS layer of the relay UE, UE#2 initiates the Service Request operation, the AS layer of the relay UE, UE#2 performs step S906 to request an RRC connection to the eNB.

Further, as the idle-mode relay UE, UE#2 receives the network connection request from the remote UE, UE#1, is also coincidentally to perform TAU to the network, and thus initiates a TAU Request, step S906 may be performed. That is, as the NAS layer of the relay UE, UE#2 initiates the TAU Request operation, the AS layer of the relay UE, UE#2 performs step S906 to request an RRC connection to the eNB. In this case, the relay UE, UE#2 may set an Active flag of the TAU Request such that the MME may establish Sl-U with the relay UE, UE#2. That is, to support reception of the service from the network at the remote UE, UE#1, the relay UE, UE#2 may be prevented from transitioning to the idle mode immediately upon completion of the TAU operation. As the relay UE, UE#2 recognizes the need for the remote UE, UE#1 to transmit data to the network based on information received from the remote UE, UE#1 in step S901, the relay UE, UE#2 may set the Active flag.

The eNB replies to the relay UE, UE#2 with a Random Access Response message in step S907.

In step S908, the relay UE, UE#2 transmits an RRC Connection Request message to the eNB. The RRC Connection Request message may be generated by the AS layer of the remote UE, UE#1 or the relay UE, UE#2 (the RRC Connection Request message may include information indicating that it is for the remote UE, UE#1 and/or for relaying). Or the RRC Connection Request message may be generated by the remote UE, UE#1 and then converted/ processed by the relay UE, UE#2 (the RRC Connection Request message may include information indicating that it is relayed by the relay UE, UE#2). For details about the RRC Connection Request message and an establishment cause in step S908, refer to the description of Embodiment 1.

In step S909, the eNB replies to the relay UE, UE#2 with an RRC Connection Setup message. The relay UE, UE#2 transitions to the connected mode.

While not shown, the relay UE, UE#2 transmits a Service Request message in an RRC Connection Setup Complete message to the eNB, and the eNB may transmit the Service Request message to the serving MME of the relay UE, UE#2, such that S1-MME and S1-U may be established for the relay UE, UE#2.

In step S910, the relay UE, UE#2 replies to the remote UE, UE#1 with a Relay Request Ack message. By the Relay Request Ack message, the relay UE, UE#2 may indicate to the remote UE, UE#1 that the relay UE, UE#2 has established an RRC connection, is in the connected mode, or has established a signaling radio bearer with the network. The Relay Request Ack message may be transmitted as it is received from the eNB or after it is converted/processed. Further, this response may indicate that the remote UE, UE#1 may exchange RRC messages and/or NAS messages with the network.

If the network is operating an AC mechanism applied to the connected mode, the relay UE, UE#2 may include related information in the message. This information may (also) be included in step S916. Therefore, the remote UE, UE#1 applies the connected mode AC mechanism.

In step S911, the remote UE, UE#1 transmits, to the relay UE, UE#2, a message requesting relay of UL traffic to the network, for example, a Relay Request message. The message may include a Service Request message generated by the NAS layer of the remote UE, UE#1. The message may explicitly or implicitly indicate the inclusion of the NAS message.

Or the message may include an AS-layer message including the Service Request message generated by the NAS layer of the remote UE, UE#1, that is, an RRC Connection Setup Complete message. The message may explicitly or implicitly indicate the inclusion of the NAS message or the inclusion of the AS message including the NAS message.

Or the message may be an RRC Connection Request message that the remote UE, UE#1 transmits to the eNB. In this case, while not shown, upon receipt of the RRC Connection Request message from the remote UE, UE#1 via the relay UE, UE#2, the eNB transmits an RRC Connection Setup message to the remote UE, UE#1 in response to the RRC Connection Request message. In this case, the remote UE, UE#1 then transmits an RRC Connection Setup Complete message to the eNB. As described before with reference to step S912, the RRC Connection Setup Complete message is transmitted to the eNB via the relay UE, UE#2.

In step S912, the relay UE, UE#2 transmits the RRC Connection Setup Complete message to the eNB. The RRC Connection Setup Complete message may be generated by the AS layer of the remote UE, UE#1 or the relay UE, UE#2 (the RRC Connection Setup Complete message may include information indicating that it is for the remote UE, UE#1). Or the RRC Connection Setup Complete message may be generated by the remote UE, UE#1 and then converted/ processed by the relay UE, UE#2 (the RRC Connection Setup Complete message may include information indicating that it is relayed by the relay UE, UE#2).

The RRC Connection Setup Complete message includes a Service Request message. The Service Request message may be generated by the NAS layer of the remote UE, UE#1 or the relay UE, UE#2 (the Service Request message may include information indicating that it is for the remote UE, UE#1). Or the Service Request message may be generated by the remote UE, UE#1 and then converted/processed by the relay UE, UE#2 (the Service Request message may include information indicating that it is relayed by the relay UE, UE#2).

In step S913, the eNB transmits the Service Request message to the serving MME of the remote UE, UE#1.

In step S914, the MME transmits an Initial Context Setup Request message to the eNB.

In step S915, the eNB and the relay UE, UE#2 set up a user plane radio bearer (i.e., DRB).

In step S916, the relay UE, UE#2 replies to the remote UE, UE#1 with a Relay Request Ack message. The Relay Request Ack message may indicate to the remote UE, UE#1 that the relay UE, UE#2 has set up the user plane radio bearer (i.e., DRB), or has prepared for relaying user traffic of the remote UE, UE#2. The message may include DRB-related QoS information and/or QoS information related to a PC5 user plane corresponding to the DRB.

Rather than the relay UE, UE#2 indicates the user-plane radio bearer setup to the remote UE, UE#1 as in step S916, the eNB may provide information about the user-plane radio bearer setup to the remote UE, UE#1 by an RRC message via the relay UE, UE#2.

In step S917, the remote UE, UE#1 transmits the UL traffic to the relay UE, UE#2. The relay UE, UE#2 transmits the UL traffic to the network. The traffic is shown as UL traffic in FIG. 9. If the traffic is CP traffic and a NAS signal, the traffic is transmitted to the serving MME of the remote UE, UE#1 via the eNB.

In steps S918 to S920,

These are operations of the Service Request procedure and conform to clause 5.3.4.1 (UE triggered Service Request) in TS 23.401. For legacy operations which have not been described in detail, refer to TS 23.401 and TS 36.331.

Unlike the above description, the remote UE, UE#1 may transmit a Service Request message in step S905. In this case, steps S910 and S911 may be skipped. That is, steps S906 to S909 and steps S912 to S920 are performed subsequently.

After step S910 or step S916, the remote UE may be regarded as in the connected mode. Thus, the remote UE, UE#1 performs a connected-mode operation as if it were connected directly to the network.

Embodiment 1-2

Figure 10:
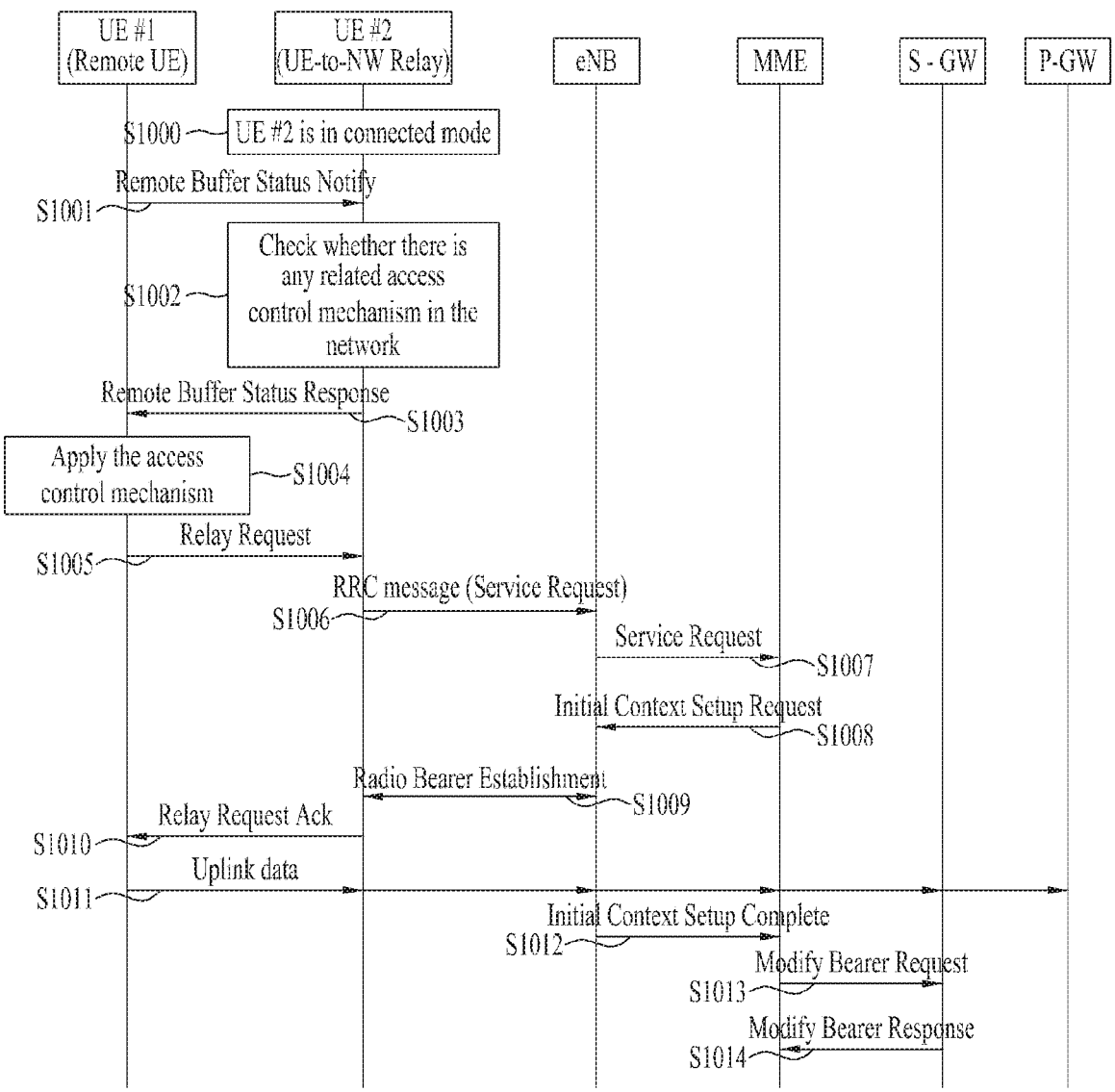

Referring to FIG. 10, the relay UE, UE#2 is in the connected mode in step S1000.

Step S1001 is identical to step S901 of Embodiment 1-1. One thing to note herein is that the remote UE, UE#1 performs step 1 for a different reason from for step 1 in Embodiment 1-1. The reason may be one or more of the following reasons.

a) The remote UE is aware that the relay UE is in the connected mode. The relay UE has explicitly or implicitly indicated that the relay UE is in the connected mode or has transitioned to the connected mode.

In this case, only when UL traffic to be transmitted to the network by the remote UE, UE#1 corresponds/relates to an AC mechanism that is also applied to the connected mode, steps S1001 to S1004 may be performed. Otherwise, step S1005 may be performed immediately.

b) After a relay-remote relationship is established with the relay UE, initial traffic to be transmitted to the network is generated.

c) A predetermined time has elapsed after the remote UE exchanges traffic with the network via the relay UE. The predetermined time is set for the remote UE, received from the relay UE, or received from the network.

d) The remote UE has no knowledge of whether the relay UE is in the idle mode or the connected mode. The relay UE has not indicated to the remote UE which mode the relay UE is in or has transitioned to.

In step S1002, the relay UE, UE#2 determines whether traffic to be transmitted to the network by the remote UE, UE#1 is related to the on-going connected-mode AC mechanism operated by the network, based on information received from the remote UE, UE#1. Information about the on-going connected-mode AC mechanism operated by the network may be known mainly based on information included in an SIB received from the eNB.

In step S1003, in the case where the traffic to be transmitted to the network by the remote UE, UE#1 is related to the on-going connected-mode AC mechanism operated by the network, as a result of the determination in step S1002, the relay UE, UE#2 transmits a response message, that is, a Remote Buffer Status Response message including all or part of information about the related AC mechanism received from the network, as it is or after it is processed. The information eventually leads to application of the related AC mechanism at the remote UE, UE#1.

If the traffic to be transmitted to the network by the remote UE, UE#1 is not related to the on-going AC mechanism operated by the network or the network is operating no AC mechanism, the relay UE, UE#2 transmits a response message, that is, a Remote Buffer Status Response message to the remote UE, UE#1. Optionally, the message may explicitly indicate that the related AC mechanism is not operated.

If the network is operating an AC mechanism, and the remote UE, UE#1 is not capable of determining whether the traffic to be transmitted to the network by the remote UE, UE#1 is related to the AC mechanism (e.g., because the remote UE, UE#1 has not included detailed information about the traffic to be transmitted to the network in step S1001), the relay UE, UE#2 transmits, to the remote UE, UE#1, a response message, that is, a Remote Buffer Status Response message including all or part of information about the on-going AC mechanism received from the network, as it is or after it is processed. The information eventually leads to application of the related AC mechanism at the remote UE, UE#1.

The above AC mechanism may be an AC mechanism applied particularly to the connected mode.

Irrespective of any of the above cases, the relay UE, UE#2 may include information indicating that the relay UE, UE#2 is in the connected mode in the Remote Buffer Status Response message in step S1003.

Step S1004 is identical to step S904 of Embodiment 1-1.

In step S1005, the remote UE, UE#1 transmits to the relay UE, UE#2 a message requesting relay of the UL traffic to the network, for example, a Relay Request message.

The message may include a Service Request message generated by the NAS layer of the remote UE, UE#1. The message may explicitly or implicitly indicate the inclusion of the NAS message.

Or the message may include an RRC message which is an AS-layer message including a Service Request message generated by the NAS layer of the remote UE, UE#1 (this is a legacy UL Information Transfer message or a newly defined RRC message). The message may explicitly or implicitly indicate the inclusion of the NAS message or the inclusion of the AS message including the NAS message.

In step S1006, the relay UE, UE#2 transmits the RRC message (the legacy UL Information Transfer message or the newly defined RRC message) to the eNB. The RRC message may be generated by the AS layer of the remote UE, UE#1 or the relay UE, UE#2 (the RRC message may include information indicating that it is for the remote UE, UE#1). Or the RRC message may be generated by the remote UE, UE#1 and then converted/processed by the relay UE, UE#2 (the RRC message may include information indicating that it is relayed by the relay UE, UE#2).

The RRC message includes a Service Request message. The Service Request message may be generated by the NAS layer of the remote UE, UE#1 or the relay UE, UE#2 (it may include information indicating that it is for the remote UE, UE#1). Or the Service Request message may be generated by the remote UE, UE#1 and then converted/processed by the relay UE, UE#2 (it may include information indicating that it is relayed by the relay UE, UE#2).

Steps S1007 to S1014 are identical to steps S913 to S920 of Embodiment 1-1.

If the network is operating the AC mechanism applied to the connected mode, the relay UE, UE#2 may include related information in step S10010. Therefore, the remote UE, UE#1 applies the connected-mode AC mechanism.

After step S1010, the remote UE may be regarded as in the connected mode. Thus, the remote UE, UE#1 performs a connected-mode operation as if it were connected directly to the network.

In Embodiment 1-1 and Embodiment 1-2, it may be assumed that the relay-remote relationship has already been established between the remote UE, UE#1 and the relay UE, UE#2 before the above-described operation. This may mean that the two UEs have established a 1:1 direct communication relationship or a 1:1 link. The relay-remote relationship establishment may amount to involving in the setup step or recognizing the setup in one or more network functions. The network functions may include the serving MME of the relay UE, the serving MME of the remote UE, the serving eNB of the remote UE, the serving eNB of the relay UE, the Prose function of the relay UE, the Prose function of the remote UE, the application server of the relay UE, and the application server of the remote UE. The same or different network functions may serve or be involved with the two UEs. For example, the same or different eNBs may serve the two UEs.

Embodiment 1-3

In the case where a relay UE (the relay UE, UE#2) is in the idle mode, if the network operates an AC mechanism for the idle mode, the network indicates the AC mechanism to remote UE(s). The indication information may specify the type of the AC mechanism. Further, the indication information may include information indicating idle mode application. This may indicate that the AC mechanism is applied in the idle mode or the relay UE is currently in the idle mode.

In the case where the relay UE (the relay UE, UE#2) is in the connected mode, if the network is operating an AC mechanism for the connected mode, the network indicates information about the on-going AC mechanism to the remote UE(s). The indication information may specify the type of the AC mechanism. Further, the indication information may include information indicating connected mode application. This may indicate that the AC mechanism is applied in the connected mode or the relay UE is currently in the connected mode.

For the indication, a PC5 discovery message, PC5 signaling, or a newly defined PC5 message may be used. Further, the indication may be broadcast or unicast to each remote UE. Further, the indication may be transmitted periodically or only once. In the latter case, it is assumed that the indication is transmitted at least once to each remote UE.

In a subsequent step, if the AC mechanism is applied/related to UL traffic to be transmitted to the network based on AC mechanism information received from the relay UE, the remote UE (the remote UE, UE#1) transmits a message requesting detailed AC mechanism information to the relay UE.

The relay UE, UE#2 transmits a response message including all or part of information about the related AC mechanism received from the network, as it is or after it is processed. The information eventually leads to application of the related AC mechanism at the remote UE, UE#1.

In the subsequent step, the remote UE, UE#1 checks whether the AC mechanism is applied to the traffic to be transmitted to the network based on the received AC mechanism information. This operation may be regarded as an operation of receiving AC mechanism information directly from the network and applying the AC mechanism information by the remote UE, UE#1. As a result of the application, the UL traffic transmission may be blocked/delayed or immediately transmitted according to the AC mechanism.

If the UL traffic can be transmitted without blockage/delay despite application of the AC mechanism, step S905 of Embodiment 1-1 or step S1005 and the subsequent steps of Embodiment 1-2 are performed.

If the UL traffic transmission is blocked/delayed according to the AC mechanism, step S905 of Embodiment 1-1 or step S1005 and the subsequent steps of Embodiment 1-2 are performed after the blockage/delay time.

For the reason that the message received from the relay UE in step S901 includes information indicating that the relay UE is in the idle mode or the AC mechanism is applied in the idle mode, step S905 and the subsequent steps of Embodiment 1-1 are performed. For the reason that the message received from the relay UE in step S1001 includes information indicating that the relay UE is in the connected mode or the AC mechanism is applied in the connected mode, step S1005 and the subsequent steps of Embodiment 1-2 are performed.

In the above description, the Service Request message may be any of various legacy Service Request messages (Service Request, Extended Service Request, and so on) used in the Service Request procedure.

While the above description has been given in the context of a Service Request message, the same thing applies to other NAS messages such as Attach Request and TAU Request.

Embodiment 2

In Embodiment 2, a description will be given of a method of efficiently providing access control, when a remote UE receives a network connection service via a relay UE.

When the relay UE is applying an AC mechanism, the relay UE may be in the idle mode, particularly in the case where the AC mechanism is ACB or EAB applied to the UE itself. However, if the AC mechanism is applied to a specific service/application, the relay UE may be in the idle mode or the connected mode.

Embodiment 2-1

Embodiment 2-1-1: Operation of Relay UE

The relay UE should apply/initiate an AC mechanism. This may mean one of the followings.
- The relay may not perform an RACH procedure to the network during a predetermined time.
- The relay UE may not perform an RRC connection request to the network during a predetermined time.
- The relay UE may not transmit a NAS message to the network during a predetermined time.
- The relay UE may not execute a specific service/application indicated by an AC mechanism during a predetermined time. The service/application may be any of MMTel voice, MMTel video, CSFB, SMS, various applications that define use priorities (rankings) (e.g., a message board used during disaster), and so on.

As such, the relay UE applies/initiates the AC mechanism because the relay UE has received related information/indication from the network. The network may be any of a RAN such as an eNB, a CN such as an MME, an application server that may execute the AC mechanism, and so on.

The relay UE may indicate to remote UE(s) that the relay UE will apply/initiate the AC mechanism via a PC5 interface. The PC5 interface refers to an interface between D2D UEs. The relay UE may broadcast, by a PC5 message, or unicast the indication to each remote UE serviced by the relay UE. When the message is transmitted, one of PC5-signaling, PC5-Discovery, and PC5-U may be used. Particularly, when the message is broadcast, only a remote UE may be allowed to receive/interpret the message (by using a transmitter address and/or a receiver address meaningful only to the remote UE. The address may be a Layer-2 ID, an IP address, or the like), or even a UE which is not placed in a relay-remote relationship with the relay UE may be allowed to receive/interpret the message. This may be applied throughout the disclosure.

The message indicating that the AC mechanism is applied may include at least one of the following pieces of information.

a) Information indicating that the relay UE applies/initiates the AC mechanism.

b) The type of the AC mechanism applied/initiated by the relay UE.

The type may be included as 'ACB', 'EAB', 'SSAC', or the like. Further, AC mechanisms may be defined as enumerated values (e.g., ACB=1, EAB=2, . . . ) and a value corresponding to each mechanism may be included.

c) If the AC mechanism to be applied/initiated is for a specific service/application, information identifying the service/application.

The information identifying the service/application may be included as 'MMTel voice', 'MMTel video', or the like. Further, services/applications may be defined as enumerated values (e.g., MMTel voice=1, MMTel video=2, . . . ) and a value corresponding to each service/application may be included. Further, information about a service and information about an application may be included separately.

d) A time of applying the AC mechanism by the relay UE.

The time refers to the ending time of the AC mechanism at the relay UE. The time value may be equal to, slightly less than, or slightly larger than a time value for applying the AC mechanism by the relay UE. When the indication message is unicast to each remote UE, the time value may be set to be different for each remote UE (in order to prevent multiple remote UEs from simultaneously transmitting network connection requests to the relay UE, after the AC mechanism is terminated).

The time information may be duration information (e.g., several seconds, several minutes, or the like), or the ending time represented as an absolute time. As such, the time information may be expressed in various manners.

e) Access class information about the relay UE.

The access class information may mean AC information to which the AC mechanism is applied.

f) if the remote UE is a higher-priority user or for a high-priority service/emergency service, information indicating whether the AC mechanism in progress at the relay UE is to be ignored (or overridden).

The indication message may be transmitted to the remote UE, only when the relay UE is to apply the AC mechanism for a time period equal to or longer than a predetermined/preconfigured time. For example, in the case where the predetermined/preconfigured time is 3 seconds, if the AC mechanism should be applied for a time shorter than 3 seconds, the relay UE does not need to transmit the indication message to the remote UE. If the AC mechanism should be applied for 3 seconds or longer, the relay UE transmits the indication message to the remote UE.

The relay UE may transmit the indication message to the remote UE, once at the time of applying/initiating the AC mechanism or periodically until the AC mechanism is terminated. In the latter case, the indication message may not include the information d).

As the relay UE applies/initiates the AC mechanism, the relay UE transmits the indication message to the remote UE, as described above. Then, the relay UE may transition to the connected mode before the ending time of the AC mechanism. Then, the relay UE operates as follows.

For various reasons, the relay UE may be in the connected mode before the ending time of the AC mechanism. For example, to receive a high priority service/emergency service, the relay UE may transmit an RRC connection request including information indicating the high priority service/emergency service, and thus an RRC connection is set up. This case corresponds to one of the reasons.

If the relay UE is placed in the connected mode as described above, the relay UE transmits a message indicating termination of the AC mechanism to the remote UE(s) via a PC5 interface. The message may be broadcast or unicast to each remote UE.

The AC mechanism termination indication message may include one of the following pieces of information.

a) Information indicating that the relay UE terminates application of the AC mechanism.

b) Information indicating that the relay UE has transitioned to the connected mode.

c) The type of the AC mechanism terminated by the relay UE.

The type may be included as 'ACB', 'EAB', 'SSAC', or the like. Further, AC mechanisms may be defined as enumerated values (e.g., ACB=1, EAB=2, . . . ) and a value corresponding to each mechanism may be included.

d) If the AC mechanism to be applied/initiated is for a specific service/application, information identifying the service/application.

The information identifying the service/application may be included as 'MMTel voice', 'MMTel video', or the like. Further, services/applications may be defined as enumerated values (e.g., MMTel voice=1, MMTel video=2, . . . ) and a value corresponding to each service/application may be included. Further, information about a service and information about an application may be included separately.

e) Access class information about the relay UE.

The access class information may mean AC information to which the AC mechanism is applied.

2-1-2: Operation of Remote UE

Upon receipt of a message indicating application of an AC mechanism as described in Embodiment 2-1-1 from a relay UE, a remote UE may transmit an ACK message to the relay UE in response to the message. The ACK message may be transmitted only when the message was unicast, not broadcast.

The remote UE applies/initiates the AC mechanism based on information included in the message indicating application of the AC mechanism. This may be eventually interpreted as that the remote UE applies the AC mechanism being applied by the relay UE in the same manner Therefore, the remote UE applying the AC mechanism does not transmit a network connection service request for a target to which the AC mechanism is applied. If the AC mechanism is applied to the UE itself (e.g., ACB or EAB), no network connection service request is transmitted to the relay UE. If the AC mechanism is applied to a specific service/application (e.g., SSAC or AC for CSFB or ACDC), this may mean that a network connection service request for the specific service/application is not transmitted to the relay UE. If the indication message is for the AC mechanism applied to the UE itself, and the relay UE includes 'e) Access Class information of the relay UE' in the indication message, the remote UE may apply/initiate the AC mechanism, only when its AC is equal to e).

In the middle of applying the AC mechanism based on the message indicating application of the AC mechanism received from the relay UE, the remote UE may perform an operation of ignoring (or overriding) the message. This operation may be intended to receive an urgent service such as a high priority service/emergency service, or may be performed because the remote UE is a higher-priority user than the relay UE. When the remote UE requests a network connection service to the relay UE, ignoring the AC mechanism as described above, the remote UE may explicitly or implicitly indicate the reason for ignoring the AC mechanism. For example, the reason may be included in PC5 signaling that the remote UE transmits to the relay UE, the PC5 user plane that transmits user traffic may indicate the reason, or an RRC message/NAS message to be transmitted to the network via the relay UE may include the reason. Upon receipt of the request from the remote UE, the relay UE attempts to connect to the network in spite of application of the AC mechanism. Herein, the relay UE may attempt to connect to the network based on the explicit or implicit reason information received from the remote UE. Additionally, the relay UE may include information indicating that this attempt is for relaying, while attempting to connect to the network.

The remote UE terminates application of the AC mechanism as follows. The remote UE applies the AC mechanism based on the AC mechanism application indication message received from the relay UE, and terminates the AC mechanism based on ending time information. In the case where the remote UE receives the AC mechanism application indication message which was broadcast, even though the ending time of the AC mechanism has elapsed, the remote UE may further wait a random time and then initiate a network connection service request to the relay UE. This operation is done to prevent multiple remote UEs from simultaneously transmitting network connection requests to the relay UE after terminating application of the AC mechanism Or upon receipt of the AC mechanism termination indication message from the relay UE, the remote UE may terminate the AC mechanism.

Embodiment 2-2

The remote UE requests a network connection service to the relay UE. This may mean one or more of transmitting PC5 signaling to the relay UE, transmitting a PC5 discovery message, transmitting an RRC message, transmitting a NAS message, and transmitting traffic, by the remote UE. This may be applied throughout the disclosure.

If the relay UE receiving the network connection service request is applying access control, that is, an AC mechanism, the relay UE checks whether the request received from the remote UE corresponds to the AC mechanism applied by the relay UE. If the request corresponds to the AC mechanism, the relay UE transmits a message rejecting the request. The rejection message may include information indicating that the rejection is attributed to application of the AC mechanism. Further, the rejection message may include various pieces of information included in the afore-described AC mechanism application indication message.

The rejection message may be transmitted to the remote UE, only when a duration during which the relay UE should apply the AC mechanism is equal to or longer than a predetermined/preconfigured time. For example, in the case where the predetermined/preconfigured time is 1 second, if the AC mechanism is to be applied shorter than 1 second, the relay UE does not need to transmit the rejection message to the remote UE. If the AC mechanism is to be applied for 1 second or longer, the relay UE transmits the rejection message to the remote UE. If the relay UE does not transmit the rejection message to the remote UE, the relay UE may buffer the network connection service request received from the remote UE, and upon termination of the AC mechanism, perform a related operation.

If the request does not correspond to the AC mechanism applied by the relay UE, the relay UE performs an operation of providing the network connection service requested by the remote UE.

Upon receipt of the rejection message from the relay UE, the remote UE may apply the AC mechanism based on the rejection message. After receiving the rejection message, the remote UE operates as described in Embodiment 2-1-2.

Embodiment 2-3: Relay Discovery-Related Operation

Embodiment 2-3-1: Relay Discovery is Performed as Model A Discovery

When the relay UE applies/initiates an AC mechanism during periodic transmission of a PC5 announcement message indicating that it is a relay, the relay UE performs one of the following operations.

1) The relay UE discontinues the transmission of the announcement message.

2) The relay UE transmits the announcement message including information indicating that the relay UE is applying the AC mechanism. The information may be various pieces of information as described in Embodiment 2-1-1.

When the relay UE terminates the AC mechanism or is placed in the connected mode, the relay UE discontinues the above operation, and transmits the original announcement message.

Upon receipt of the announcement message described in 2), a UE which has discovered the relay UE to receive a network connection service performs one of the following operations.

1) The UE excludes the relay UE from relay UE choice candidates.

2) The UE includes the relay UE as a relay UE choice candidate, regarding the relay UE as having a lowest priority.

3) After the ending time of the AC mechanism, the UE includes the relay UE as a relay UE choice candidate.

Embodiment 2-3-2: Relay Discovery is Performed as Model B Ddiscovery.

Upon receipt of a PC5 solicitation message from a UE discovering the relay UE while the relay UE is applying an AC mechanism, the relay UE performs one of the following operations.

1) The relay UE does not respond to the solicitation message.

2) The relay UE transmits a PC5 response message in response to the solicitation message. Herein, the relay UE includes information indicating the AC mechanism in progress age. Herein, the relay UE includes information indicating the AC mechanism in progress in the PC5 response message. The information may be various pieces of information as described in Embodiment 2-1-1.

Upon receipt of the response message described in 2), a UE which is discovering the relay UE performs one of the following operations.

1) The UE excludes the relay UE from relay UE choice candidates.

2) The UE includes the relay UE as a relay UE choice candidate, regarding the relay UE as having a lowest priority.

3) After the ending time of the AC mechanism, the UE includes the relay UE as a relay UE choice candidate.

The relay UE may be in the idle mode, while it is applying the AC mechanism, particularly when the AC mechanism is ACB or EAB applied to the UE itself. However, if the AC mechanism is applied to a specific service/application, the relay UE may be in the idle mode or the connected mode.

Figure 11:
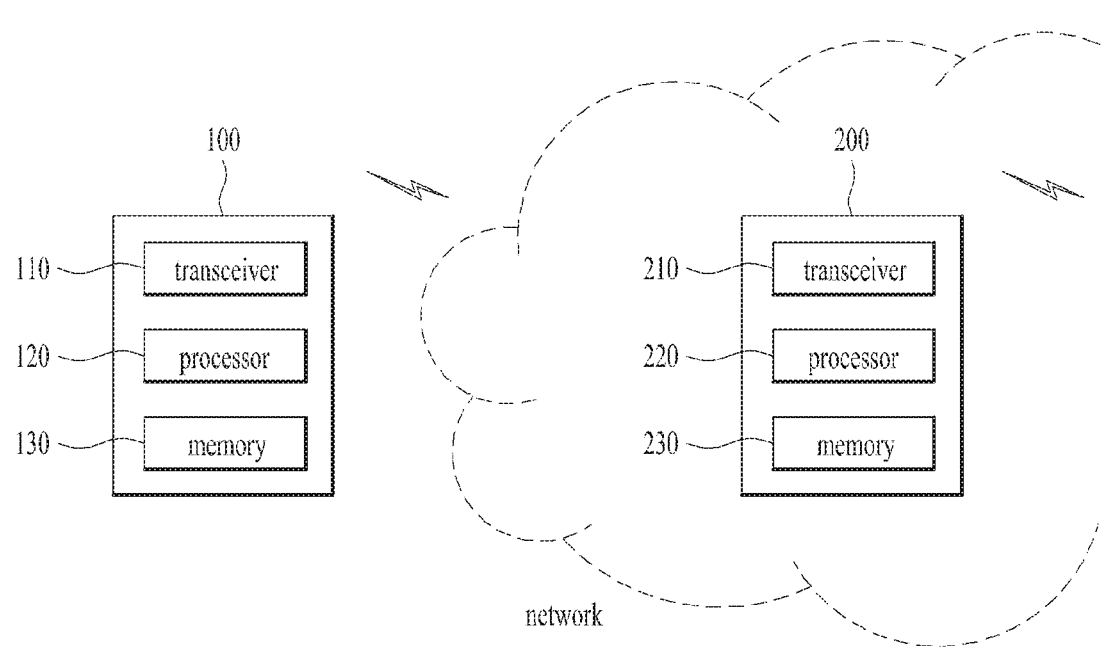
FIG. 11 is a block diagram illustrating a node device according to an embodiment of the present disclosure.

FIG. 11 is a block diagram of a preferred embodiment of a UE and a network node according to an example of the present disclosure.

Referring to FIG. 11, a UE 100 of the present disclosure may include a transceiver 110, a processor 120, and a memory 130. The transceiver 110 may be configured to transmit various signals, data, and information to an external device and to receive various signals, data, and information from an external device. The UE 100 may be connected to the external device wiredly and/or wirelessly. The processor 120 may provide overall control to the UE 100, and may be configured to compute and process information transmitted and received to and from the external device by the UE 100. The memory 130 may store computed and processed information for a predetermined time and may be replaced with a component such as a buffer (not shown). Further, the processor 120 may be configured to perform a UE operation proposed in the present disclosure.

Referring to FIG. 11, a network node 200 of the present disclosure may include a transceiver 210, a processor 220, and a memory 230. The transceiver 210 may be configured to transmit various signals, data, and information to an external device and to receive various signals, data, and information from an external device. The network node 200 may be connected to the external device wiredly and/or wirelessly. The processor 220 may provide overall control to the network node 200, and may be configured to compute and process information transmitted and received to and from the external device by the network node 200. The memory 230 may store computed and processed information for a predetermined time and may be replaced with a component such as a buffer (not shown). Further, the processor 220 may be configured to perform a network node operation proposed in the present disclosure. Specifically, the processor 220 may receive a relay request from a remote UE. After receiving the relay request, the processor 220 may transmit a random access preamble to an eNB and receive a random access response in response to the random access preamble. After receiving the random access response, the processor 220 may transmit an RRC connection request and receive an RRC connection setup in response to the RRC connection request. Then, the processor 220 may transmit an RRC connection setup complete message. An establishment cause included in the RRC connection request may be determined in consideration of one or more of whether the relay UE needs to request a connection for traffic of the relay UE and priority between an establishment cause for the connection request for traffic of the relay UE and an establishment cause set based on information provided by the remote UE.

The specific configurations of the UE 100 and the network node 200 may be implemented such that various embodiments of the present disclosure are applied independently or in combination of two or more thereof. For clarity, a redundant description is avoided.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described above in the context of a 3GPP system, they are applicable in the same manner to many other mobile communication systems.

What is claimed is:

1. A method of establishing a connection with a network by a relay user equipment (UE) having a connection to a remote UE in a wireless communication system, the method comprising:
   receiving a relay request from the remote UE;
   transmitting a random access preamble to a base station (BS) after receiving the relay request;
   receiving a random access response in response to the random access preamble;
   transmitting a radio resource control (RRC) connection request message after receiving the random access response; and
   transmitting an RRC connection setup complete message after receiving an RRC connection setup message in response to the RRC connection request message,
   wherein when the relay UE does not need to request a connection for traffic of the relay UE, an establishment cause included in the RRC connection request message is configured based on information provided by the remote UE and the RRC connection setup complete message includes an establishment cause configured for use in a relay operation of the relay UE, and
   wherein when the relay UE needs to request the connection for the traffic of the relay UE, the RRC connection request message includes an establishment cause having a higher priority between the establishment cause configured for the connection request for the traffic of the relay UE and the establishment cause configured based on the information provided by the remote UE, and the RRC connection setup complete message includes an establishment cause having a lower priority between the establishment cause configured for the connection request for the traffic of the relay UE and the establishment cause configured based on the information provided by the remote UE.

2. The method according to claim 1, wherein the RRC connection setup complete message includes information indicating that the establishment cause transmitted in the RRC connection request message is for the remote UE, if the relay UE does not need to request the connection for the traffic of the relay UE.

3. The method according to claim 1, wherein the RRC connection setup complete message includes information indicating whether the establishment cause transmitted in the RRC connection request message is for the remote UE, if the relay UE does not need to request the connection for the traffic of the relay UE.

4. The method according to claim 1, further comprising receiving a message indicating generation of traffic from the remote UE.

5. The method according to claim 4, wherein the message indicating generation of traffic includes one or more of information indicating uplink traffic, information indicating control plane (CP) traffic, a priority of the traffic, a priority of the remote UE, access class information about the remote UE, and access control (AC) applicable to the traffic.

6. The method according to claim 4, wherein in one of a case in which the remote UE is aware that the relay UE is idle, a case in which uplink traffic is initially generated after the remote UE establishes a connection with the relay UE, a case in which a predetermined time has elapsed after the remote UE transmits and receives traffic via the relay UE, and a case in which the remote is not aware whether the relay UE is idle, the remote UE transmits the message indicating generation of traffic.

7. The method according to claim 4, wherein the relay UE determines whether the traffic generated by the remote UE is related to AC.

8. The method according to claim 7, wherein the relay UE transmits a response to the message indicating generation of traffic to the remote UE, and if the traffic generated by the remote UE is related to AC, the response to the message indicating generation of traffic includes AC information.

9. The method according to claim 8, wherein if the response to the message indicating generation of traffic includes AC information, the remote UE determines whether AC is applied to the traffic generated by the remote UE.

10. A relay user equipment (UE) having a connection to a remote UE, for establishing a connection with a network in a wireless communication system, the relay UE comprising:
   a transceiver; and
   a processor,
   wherein the processor is configured to receive a relay request from the remote UE, to transmit a random access preamble to a base station (BS) after receiving the relay request, to receive a random access response in response to the random access preamble, to transmit a radio resource control (RRC) connection request message after receiving the random access response, and to transmit an RRC connection setup complete message after receiving an RRC connection setup message in response to the RRC connection request message, and
   wherein when the relay UE does not need to request a connection for traffic of the relay UE, an establishment cause included in the RRC connection request message is configured based on information provided by the remote UE and the RRC connection setup complete message includes an establishment cause configured for use in a relay operation of the relay UE,
   wherein when the relay UE needs to request the connection for the traffic of the relay UE, the RRC connection request message includes an establishment cause having a higher priority between the establishment cause configured for the connection request for the traffic of the relay UE and the establishment cause configured based on the information provided by the remote UE, and the RRC connection setup complete message includes an establishment cause having a lower priority between the establishment cause configured for the connection request for the traffic of the relay UE and the establishment cause configured based on the information provided by the remote UE.

* * * * *